United States Patent
Ao et al.

(10) Patent No.: US 9,564,027 B2
(45) Date of Patent: Feb. 7, 2017

(54) MODULATING BRIGHTNESS OF OPTICAL ELEMENT CONVEYING HUMAN-DISCERNIBLE INFORMATION TO ALSO CONVEY MACHINE-DISCERNIBLE INFORMATION

(71) Applicant: Lenovo Enterprise Solutions (Singapore) PTE. LTD., New Tech Park (SG)

(72) Inventors: Rong Eric Ao, Morrisville, NC (US); Donald Richard Dignam, Morrisville, NC (US); Jian Meng, Ottawa (CA); Georges Pierre Turcotte, Morrisville, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 49 days.

(21) Appl. No.: 14/667,100

(22) Filed: Mar. 24, 2015

(65) Prior Publication Data

US 2016/0284171 A1    Sep. 29, 2016

(51) Int. Cl.
*G08B 5/00* (2006.01)
*G08B 5/36* (2006.01)

(52) U.S. Cl.
CPC ..................... *G08B 5/36* (2013.01)

(58) Field of Classification Search
CPC ........................................ G08B 5/36
USPC ..................... 340/815.4, 555, 635
See application file for complete search history.

(56) References Cited

U.S. PATENT DOCUMENTS

| 6,628,203 | B1 * | 9/2003 | Oost ............. G06F 11/324 340/500 |
| 7,308,194 | B2 | 12/2007 | Iizuka et al. |
| 7,319,404 | B2 * | 1/2008 | Sturges .............. H04L 67/36 340/635 |
| 2009/0214225 | A1 * | 8/2009 | Nakagawa ...... H04B 10/1149 398/191 |

FOREIGN PATENT DOCUMENTS

EP    1855398 B1    2/2010

\* cited by examiner

*Primary Examiner* — Dhaval Patel
(74) *Attorney, Agent, or Firm* — Katherine Brown

(57) ABSTRACT

An optical element conveying human-discernible information to a user has its brightness modulated to also convey machine-discernible information to an optical detector. A frame section in which a bit of data can be conveyed begins at a falling edge of a preceding frame section corresponding to the brightness of the optical element decreasing to a low level. At a first predetermined point within the frame section, if the bit of data is logic one, the brightness is increased to a high level, corresponding to a rising edge. At a later, second predetermined point within the frame section, if the bit of data is logic zero, the brightness is increased to the high level, corresponding to the rising edge. At the end of the frame section, the brightness is decreased to the low level, corresponding to a falling edge of the frame section.

19 Claims, 7 Drawing Sheets

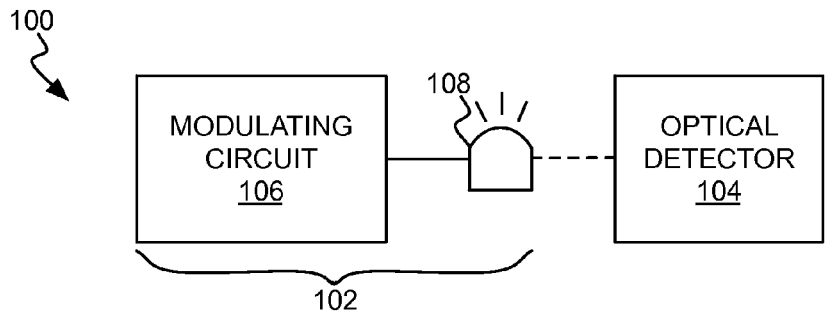
FIG 1
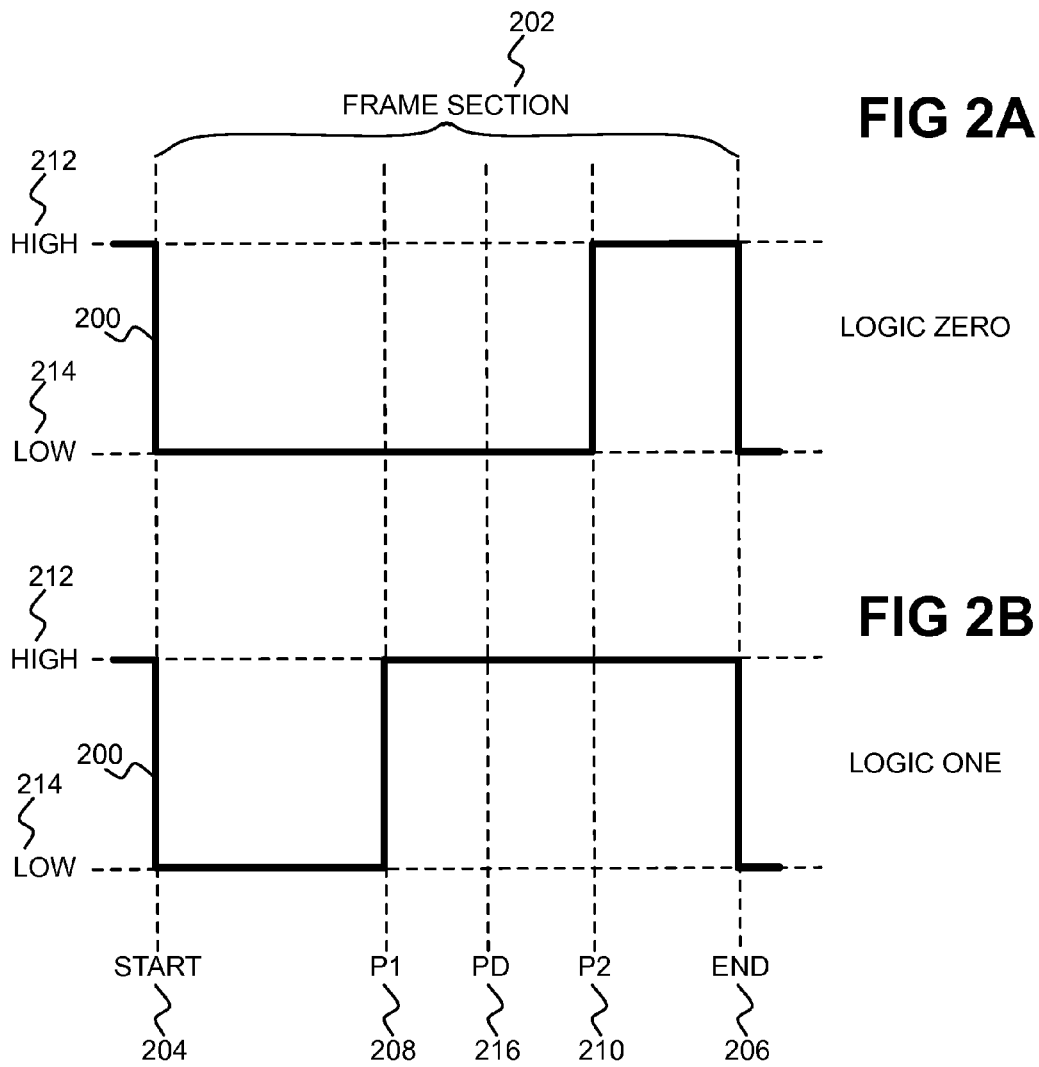
FIG 2A
FIG 2B

US 9,564,027 B2

MODULATING BRIGHTNESS OF OPTICAL ELEMENT CONVEYING HUMAN-DISCERNIBLE INFORMATION TO ALSO CONVEY MACHINE-DISCERNIBLE INFORMATION

BACKGROUND

Optical elements can be employed to convey human-discernible information to users. For example, discrete light-emitting diodes (LEDs) on consumer electronic devices and other types of electronic devices can provide status information to users, such as whether the devices are on, and in what modes they are operating. As another example, flat-panel televisions and displays that include panels of display elements, such as LEDs, organic LEDs (OLEDs), and liquid crystal display (LCD) elements, among others, can appropriately control those elements in unison to display images, such as video, to users.

SUMMARY

An example device includes an optical element to convey human-discernible information to a user. The device includes a modulating circuit to modulate a brightness of the optical element to convey machine-discernible information to an optical detector in addition to the human discernible information.

An example non-transitory computer-readable medium stores computer executable code that when executed by a computing device causes the computing device to perform a method. The method includes detecting, by an optical detector of the computing device, a brightness of an optical element decreasing from a high level to a low level. The method includes waiting a predetermined length of time after detecting the brightness decreasing to the low level. The method includes, after the predetermined length of time has elapsed, redetecting the brightness of the optical element, as a data-conveying brightness of the optical element. The method includes, if the data-conveying brightness corresponds to the low level, determining that the optical element has transmitted a bit corresponding to logic zero. The method includes, if the data-conveying brightness corresponds to the high level, determining that the optical element has transmitted a bit corresponding to logic one.

An example method is for optically transmitting a bit of data. The method includes, at a first predetermined point within a frame section beginning at a falling edge of a preceding frame section corresponding to a brightness of an optical element decreasing to a low level, if the bit of data to be transmitted within the frame section is logic one, increasing, by a circuit, the brightness of the optical element to a high level, corresponding to a rising edge. The method includes, at a second predetermined point within the frame section later than the first predetermined point, if the bit of data is logic zero, increasing, by the circuit, the brightness of the optical element to the high level, corresponding to the rising edge. The method includes, at an end of the frame section, decreasing, by the circuit, the brightness to the low level, corresponding to a fall edging of the frame section.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 1 is a diagram of an example system by which an optical element has its brightness modulated to convey machine-discernible information.

FIGS. 2A and 2B are timing diagrams depicting example brightness modulation to transmit a logic zero bit and a logic one bit, respectively, within a frame section.

DETAILED DESCRIPTION

Figure 3:
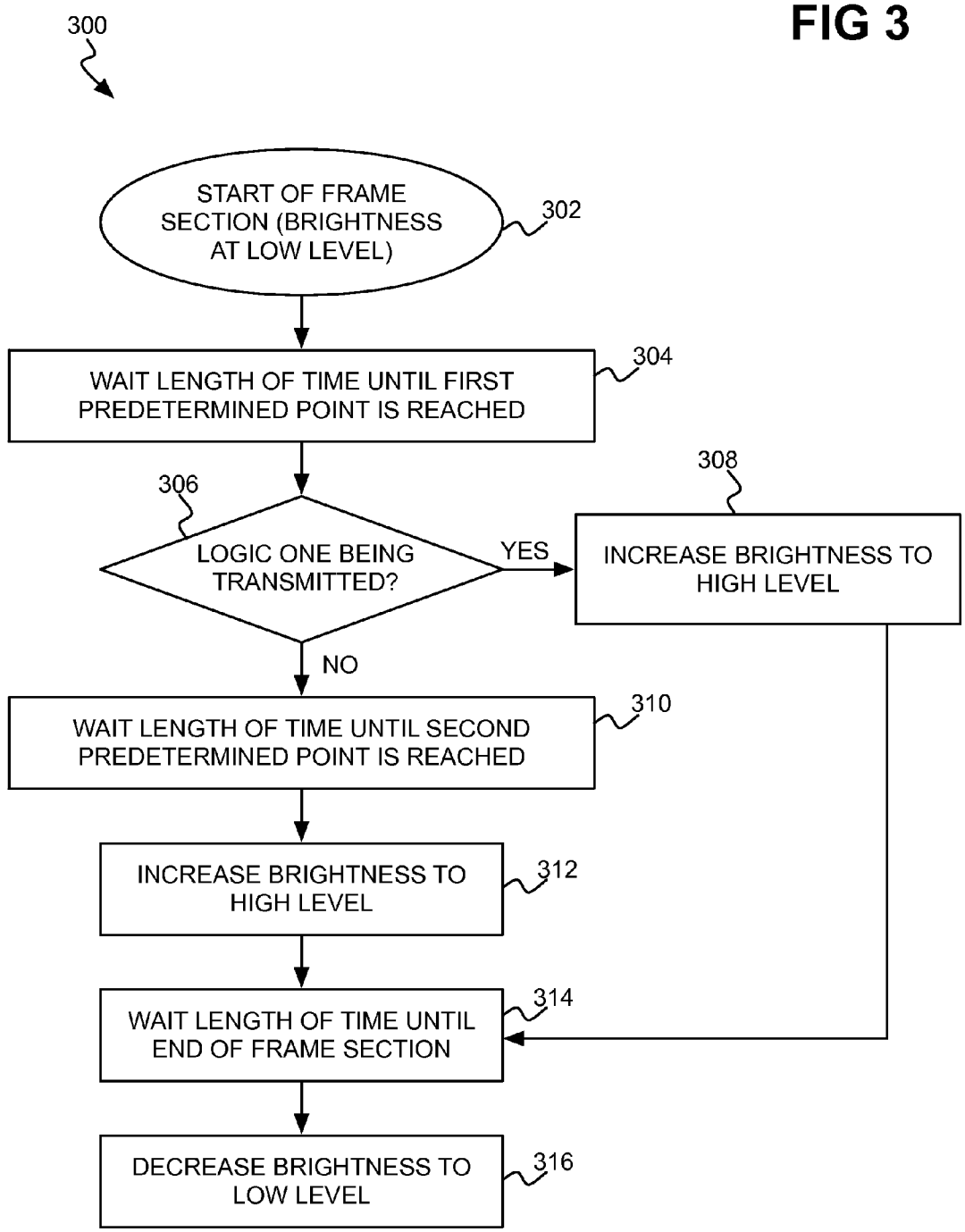
FIG. 3 is a flowchart of an example method to transmit a bit of data within a frame section via brightness modulation.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background, optical elements can convey human-discernible information to users. Techniques disclosed herein leverage these optical elements to also convey machine-discernible information that is not discernible to users, without affecting their ability to still convey human-discernible information to users at the same time. This is achieved by modulating a brightness of an optical element to convey machine-discernible information. An optical detector, such as a specialized device or even a smartphone's camera, can then be used to detect this information.

By modulating the brightness of an optical element at a speed greater than a flickering threshold at which a user might observe or perceive flickering caused by the modulation, the user can even be unaware that the element is conveying machine-discernible information in addition to the human-discernible information. Furthermore, when the brightness of the optical element is being modulated, its operating brightness can be increased to maintain an average brightness equal to the element's operating brightness when the element is not being modulated. This also ensures that the user may remain unaware that the optical element is conveying machine discernible information in addition to human-discernible information.

Multiple optical elements can be modulated in parallel to provide machine-discernible information more quickly. The optical elements may be LEDs located on electronic devices to provide additional information regarding the devices to the end users themselves or to technicians servicing the devices. They may be located at transportation stops, such as bus stops, train stops, and so on, to provide detailed information regarding the buses and trains that stop there. The optical elements may be disposed on commercial billboards for end users to detect with their smartphones to receive further information regarding the products and services advertised on the billboards.

A subset of optical elements of a television screen or another type of display screen, such as at a corner thereof, may convey additional information regarding the devices, the programs being displayed currently thereon, and so on. Maritime application includes modulating the optical elements (i.e., the lights) of lighthouses, as well as similar such lights of ships. The foregoing represent examples of the techniques disclosed herein, and other examples can be readily contemplated without departing from these techniques to modulate an optical element to convey machine-discernible information in addition to human-discernible information.

FIG. 1 shows an example system 100. The system 100 includes a device 102 and an optical detector 104, which may be part of a different device. The device 102 includes a modulating circuit 106 and an optical element 108. The optical element 108 may be a discrete optical element, such as an LED, or a display element of a number of contiguous display elements, such as a flat-panel display.

The optical element 108 can be turned on or off to convey human-discernible information to a user. For example, the element 108 may be turned on to indicate that the device 102 itself is on, that a communications link has been established, and so on. The element 108 may blink (i.e., transition between being on and off) to convey other information to the user, such as that data is currently being transmitted. This information is human-discernible information, in that a human observer can readily detect the state of the optical element 108 by virtue of whether it is on, off, blinking, and so on.

In the case where the optical element 108 is a display element of a number of contiguous display elements, such as a flat-panel display, the optical element 108 may change state, such as being on, off, or have a brightness, in accordance with a pixel or sub-pixel to which the display element corresponds. In conjunction with the other contiguous display elements the element 108 displays an image, such as a moving image, to a user. This information is also human-discernible information, in that a human observer can readily view the image that is displayed by the display elements including the element 108.

The modulating circuit 106 modulates a brightness of the optical element 108 to convey machine-discernible information in addition to the human-discernible information. As noted above, the circuit 106 can modulate the brightness at a speed greater than a flickering threshold at which a human observer perceives flicking resulting from the modulation. For example, so long as the modulation occurs at a frequency rate of at least 24, 30, or 60 Hertz (Hz), a human observer may not be able to perceive flickering.

However, the average brightness of the optical element 108 when the modulating circuit 106 performs modulation may be reduced, if the brightness is modulated between the normal operating brightness (when the element 108 is not being modulated) and a lower brightness. A human observer may discern this decrease in average brightness. If such a decrease is not desired, the modulating circuit 106 can modulate the brightness between a brightness higher than the normal operating brightness, and the lower brightness, so that the average brightness during modulation remains equal to the normal operating brightness when the optical element 108 is not being modulated. By maintaining the average brightness in this way, and modulating the brightness at a sufficiently high frequency, users are unable to discern that modulation is occurring, and thus may be unaware that machine-discernible information is being conveyed.

The machine-discernible information is not human discernible. First, if the brightness is modulating at a sufficient frequency that a user is unable to detect that the modulation is occurring, the user is unable to even discern whether or not machine-discernible information is being transmitted. Second, even if the user is able to discern that machine-discernible information is being transmitted, there is no way by which the user can discern what information is being transmitted. This is because the modulation occurs quickly enough that to the unaided eye, a user would be unable to count the modulations even if he or she can detect that they are occurring.

The optical detector 104 may be an optical sensor, or another type of hardware mechanism, that is able to detect the changes in brightness of the optical element 108 resulting from modulation by the modulating circuit 106. The changes in brightness are then decoded to determine the machine-discernible information encoded in the modulated brightness of the element 108. The optical detector 104 may be able to detect the changes in brightness when placed adjacent to or in close proximity of the optical element 108, or depending on the brightness and size of the optical element 108 and/or the sensitivity of the detector 104 itself, at great distances therefrom.

FIGS. 2A and 2B show example timing diagrams for modulating a brightness 200 of the optical element 108 within a frame section 202 to convey a logic zero and a logic one, respectively, of the machine-discernible information. The frame section 202 has a start 204 and an end 206. The start 204 corresponds to a falling edge of the brightness 200, corresponding to the brightness 200 decreasing from a high level 212 to a low level 214, within an immediately adjacent preceding frame section. The end 206 likewise corresponds to a falling edge of the brightness 200, again corresponding to the brightness 200 decreasing from the high level 212 to the low level 214, and serves as a start frame of an immediately adjacent successive frame section.

The high level 212 of the brightness 200 of the optical element 108 may be greater than the operating brightness of the element 108 when the modulating circuit 106 is not performing modulation, as noted above, so that an average level of the brightness 200 remains equal to this operating brightness. The low level 214 of the brightness 200 is less than the high level 212. In one implementation, the low level 214 may not correspond to the brightness 200 being zero (i.e., corresponding to the element 108 being turned off such that it emits no light), but rather a percentage, such as ten or twenty percent, of the high level 212. That is, in this implementation, the brightness 200 is modulated between two non-zero brightness levels of light: the low level 214 and the high level 212.

At a first point 208 after the start 204 of the frame section 202, if the bit of data of the machine-discernible information to be conveyed in the frame section 202 is logic one, the brightness 200 of the optical element 108 is increased to the high level 212, per FIG. 2B, corresponding to a rising edge. By comparison, if the bit to be conveyed is logic zero, the brightness 200 of the optical element 108 is maintained at the low level 214 at the first point per FIG. 2A. Thereafter, at a second point 210 after the first point 208, if the bit to be conveyed is logic zero, the brightness 200 of the element 108 is increased to the high level 212, per FIG. 2A, corresponding to a rising edge. If the bit to be conveyed is logic one, the brightness 200 is maintained at the high level 212, per FIG. 2B.

In the frame section 202, then, the brightness 200 of the optical element 108 is increased to the high level 212 just once, at the first point 208 in the case where a logic one is being conveyed as in FIG. 2B, or at the second point 210 in the case where a logic zero is being conveyed as in FIG. 2A. Likewise, the brightness 200 is decreased to the low level 214 just once, at the end 206 of the frame section 202. In this respect, it is said that the decrease in the brightness 200 to the low level 214 at the start 204 occurs at the end of the preceding frame section.

The optical detector 104 detects the brightness 200 of the optical element 108 at a detection point 216 that is between the first point 208 and the second point 210. When a logic zero is being conveyed, as in FIG. 2A, the brightness 200 that is detected at the detection point 216 is at the low level 214. When a logic one is being conveyed, as in FIG. 2B, the brightness 200 that is detected at the detection point 216 is at the high level 212. The bit of data of the frame section 202 is thus detectable between the first point 208 and the second point 210, such as at the detection point 216, and not accurately detectable prior to the first point 208 nor after the second point 210. Prior to the first point 208, a logic one is not accurately detectable in FIG. 2B; prior to the second point 210, a logic zero is not accurately detectable in FIG. 2A.

Modulating the brightness 200 in the manner described in relation to FIGS. 2A and 2B permits the serial transmission of machine-discernible information in a self-clocking manner. That is, the device 102 does not have to convey to the optical detector 104 clock information for the detector 104 to detect the bits of data being transmitted. Furthermore, the device 102 and the detector 104 do not have to be synchronized to a common clock for the detector 104 to detect the bits of data being transmitted via modulation of the brightness 200.

This is because the optical detector 104 can detect the start 204 of the frame section 202 as corresponding to a falling edge (i.e., a decrease in brightness 200 from the high level 212 to the low level 214). At no time within the frame section 202, except at the very end 206, does the brightness 200 decrease. As such, when the optical detector 104 detects a decrease in the brightness 200, the detector 104 knows that it has detected the end of one frame section and the beginning of another frame section 202.

Once the optical detector 104 has detected the start 204 of the frame section 202, the detector 104 waits a predetermined length of time corresponding to the detection point 216, at which it again detects the brightness 200 of the optical element 108. The predetermined length of time can be pre-specified ahead of a time so that the modulating circuit 106 and the optical detector 104 operate accordingly. The circuit 106 thus ensures that the first point 208 occurs before the detection point 216 and the second point 210 occurs after the detection point 216; the detector 104 ensures that the brightness 200 corresponding to the bit of data being transmitted will be detected at the detection point 216.

For example, by selecting the predetermined length of time as corresponding to the mid point between the first point 208 and the second point 210, maximum resistance to jitter and other issues can be achieved. The detector 104 knows that the brightness 200 of the optical element 108 at the detection point 216 corresponds to the bit of data (logic zero or logic one) being conveyed within the frame section 202. As such, the optical detector 104 does not have to be synchronized with the device 102 with respect to a common clock, and does not have to receive clock information from the device 102, to accurately determine the bits of data that the device 102 is transmitting.

FIG. 3 shows an example method 300 for modulating the brightness 200 of the optical element 108 to convey a bit of data (logic zero or logic one) of the machine-discernible information. The method 300 is performed by the modulating circuit 106. More generally, the method 300 can be performed by a device, such as a computing device, executing computer-executable code stored on a non-transitory computer-readable medium.

The method 300 begins at the start of a frame section 202 (302), at which the brightness 200 is at the low level 214, corresponding to the falling edge of the previous frame section. A length of time is waited until the first point 208 is reached (304). At this time, if a logic one is being transmitted (306), then the brightness 200 is increased to the high level 212 (308). Otherwise, a logic zero is being transmitted, a further length of time is waited until the second point 210 is reached (312). At this time, the brightness 200 is increased to the high level 212 (312). From both parts 308 and 312 the method 300 proceeds to part 314, in which another length of time is waited until the end 206 of the frame section 202 (314). At the end 206 of the frame section 202, the brightness 200 is decreased to the low level 214 (316).

Figure 4:
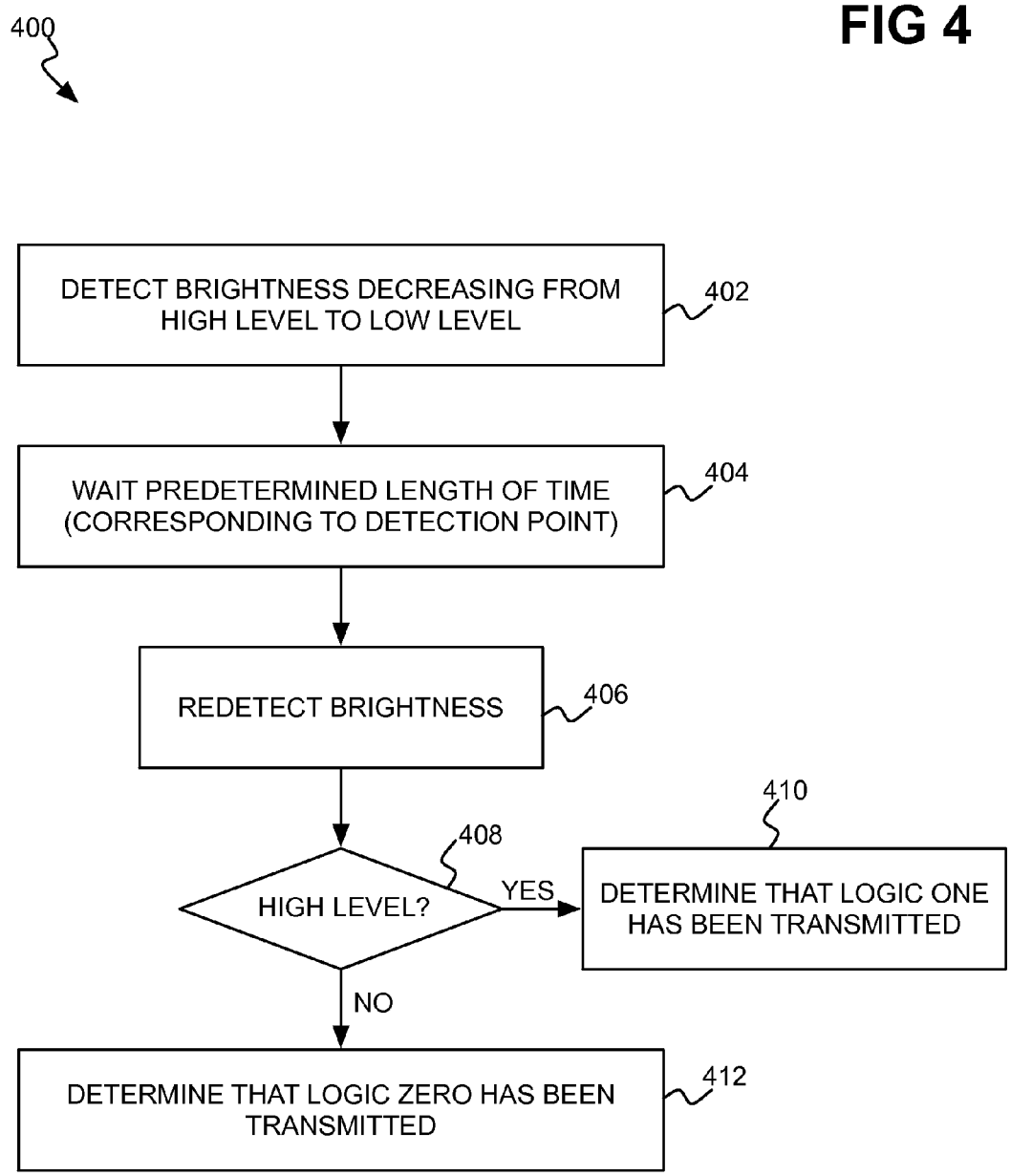
FIG. 4 is a flowchart of an example method to optically detect a bit of data transmitted within a frame section via brightness modulation.

FIG. 4 shows an example method 400 for detecting whether a bit of data of the machine-discernible information being transmitted by modulating the brightness 200 of the optical element 108 is a logic zero or a logic one. The method 400 is performed by the optical detector 104, or by a device including the detector 104. More generally, like the method 300, the method 400 can be performed by a device, such as a computing device, executing computer-executable code stored on a non-transitory computer-readable medium.

The method 400 detects the brightness 200 decreasing from the high level 212 to the low level 214 (402), which corresponds to the beginning of a frame section 202. The method 400 waits for a predetermined length of time corresponding to the detection point 216 (404). At this time, the brightness 200 of the optical element 108 is redetected (406). If the brightness 200 is at the high level 212 (408), then it is determined that a logic one has been transmitted (410). Otherwise, the brightness 200 is at the low level 214, and it is determined that a logic zero has been transmitted (412).

Figure 5:
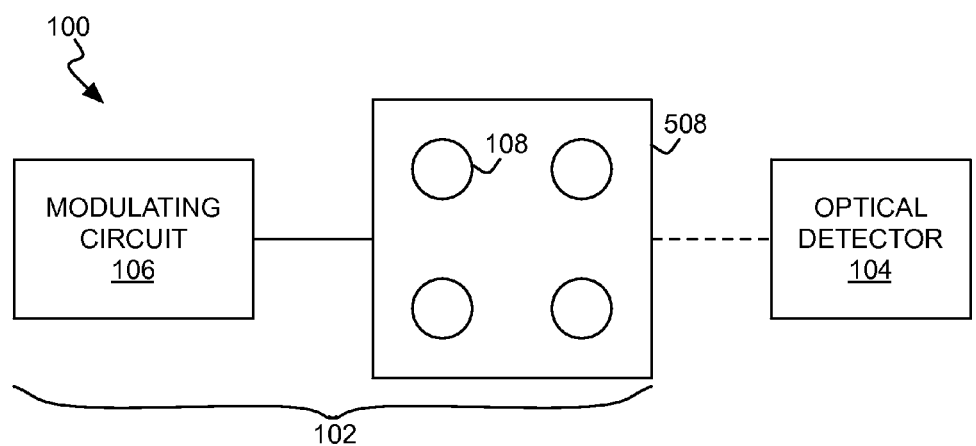
FIG. 5 is a diagram of an example system in which multiple optical elements have their brightness modulated to convey machine-discernible information.

FIG. 5 shows the example system 100 in which there are multiple optical elements 508, including the optical element 108, in addition to the modulating circuit 106 of the device 102 and the optical detector 104. In this implementation, the optical elements 508 have their brightness modulated in parallel to simultaneously transmit different bits of data of the machine-discernible information. That is, in the implementation of FIG. 1, in any given frame section, just one bit of data can be transmitted, whereas in the example implementation of FIG. 5, multiple bits of data (corresponding to, such as being equal to, the number of elements 508) can be transmitted.

The optical elements 508 can correspond to different data channels of the machine-discernible information. The different data channels may be employed to transmit different types of information. The different data channels can also be employed to transmit the same information, but more quickly. For example, if there are four data channels, given information can be transmitted four times as quickly as if there is just one data channel.

The data of each data channel may be serially transmitted by the modulating circuit 106 modulating the brightness of the corresponding optical element 508. The data of the each data channel, however, can be considered as being transmitted in parallel with the data of the other data channels, by the modulating circuit 106 modulating the brightnesses of the optical elements 508 in a synchronized manner, such at the end of a frame section, the brightness of each optical element 508 being decreased. That is, the frame sections in which the optical elements 508 transmit bits of data are aligned with one another.

Figure 6:
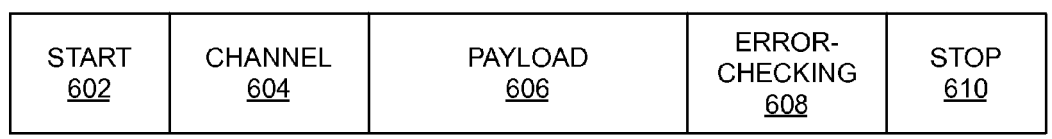
FIG. 6 is a diagram depicting an example data frame within which machine-discernible information may be transmitted via brightness modulation.

FIG. 6 shows an example data frame 600 in which the modulating circuit 106 can convey machine-discernible information by modulating each optical element 508. FIG. 6 is described in relation to the optical element 108, however. The data frame 600 is made up of a number of frame sections, such as a number of the frame sections 202 that have been described. The data frame 600 specifically can include start frame sections 602, channel frame sections 604, payload frame sections 606, error-checking frame sections 608, and stop frame sections 610.

The start frame sections 602 include the bits of the data that are pre-specified to signify the beginning of the data frame 600. The optical detector 104, for instance, may ignore data that it has detected until it identifies the start frame sections 602. The channel frame sections 604 include the bits of the data that identify the data channel to which the optical element 108 corresponds. The optical detector 104 uses the data of the channel frame sections 604 thus to identify the data channel in this respect. If there is just one optical element 108, then the channel frame sections 604 may be omitted. If there are just two optical elements 508, then there may be just one channel frame section 604, where a logic zero corresponds to one data channel and a logic one corresponds to another data channel.

The payload frame sections 606 include the bits of the data that correspond to the machine-discernible information itself. That is, the other frame sections 602, 604, 608, and 610 convey data that is used to ensure that the machine-discernible information is properly detected by the optical detector 104. However, because there is at least the potential that the optical detector 104 may incorrectly detect one or more of these bits of data (as well as the data of the channel frame sections 604), the error-checking frame sections 608 can be included.

The error-checking frame sections 608 include the bits of the data that can be calculated from the bits of the data of the payload frame sections 606 (and that of the channel frame sections 604) for the optical detector 104 to use to determine whether it has successfully (i.e., accurately) detected this data or information. That is, the optical detector 104 calculates its own error-checking information, and compares it to the information represented by the data of the error-checking frame sections 608. If the information agrees, then this means that the optical detector 104 has correctly detected the data in question. The error-checking information may be in the form of a checksum, for instance.

Finally, the stop frame sections 610 include the bits of the data that are pre-specified to signify the end of the data frame 600. The optical detector 104, for instance, may begin detecting a new data frame once it has identified the stop frame sections 610 of the current data frame 600. Over multiple data frames, then, the modulating circuit 106 transmits the machine-discernible information to the optical detector 104.

A given quantity of machine-discernible information may be transmitted over a smaller number of such data frames (or even just one data frame) if there is not much information to be transmitted, and/or if the operating environment and/or the sensitivity of the optical detector 104 is optimal. By comparison, a larger number of data frames may be used if there is a large amount of information to be transmitted, and/or if the operating environment and/or the sensitivity of the optical detector 104 is not as optimal. There is more overhead in transmitting a larger number of data frames than a smaller number of data frames, but a smaller number of such frames may be able to be transmitted more robustly than a larger number.

The transmission of the machine-discernible information is generally performed from the device 102 to the optical detector 104 without a feedback loop from the detector 104 back to the device 102. The device 102 thus does not know when the optical detector 104 has begun receiving the machine-discernible information, or whether it has correctly received this information. Therefore, the machine-discernible information is repeatedly transmitted in a loop. For example, bus or train schedule information may be constantly and repetitively transmitted, so that users can receive the information at any given time without undue delay.

Furthermore, because the optical detector 104 cannot indicate to the device 102 that it has failed to correctly detect a given part of the machine-discernible information, the detector 104 has to wait for the device 102 to again transmit this part of the information. As such, the amount of machine-discernible information to be transmitted may be relatively small, or various parts of the information may be transmitted a number of times in succession before other parts are transmitted. Both of these strategies ensure that in a reasonable length of time, the optical detector 104 is able to detect the machine-discernible information that the device 102 is transmitting by modulation of the brightnesses of the optical elements 508.

Figure 7:
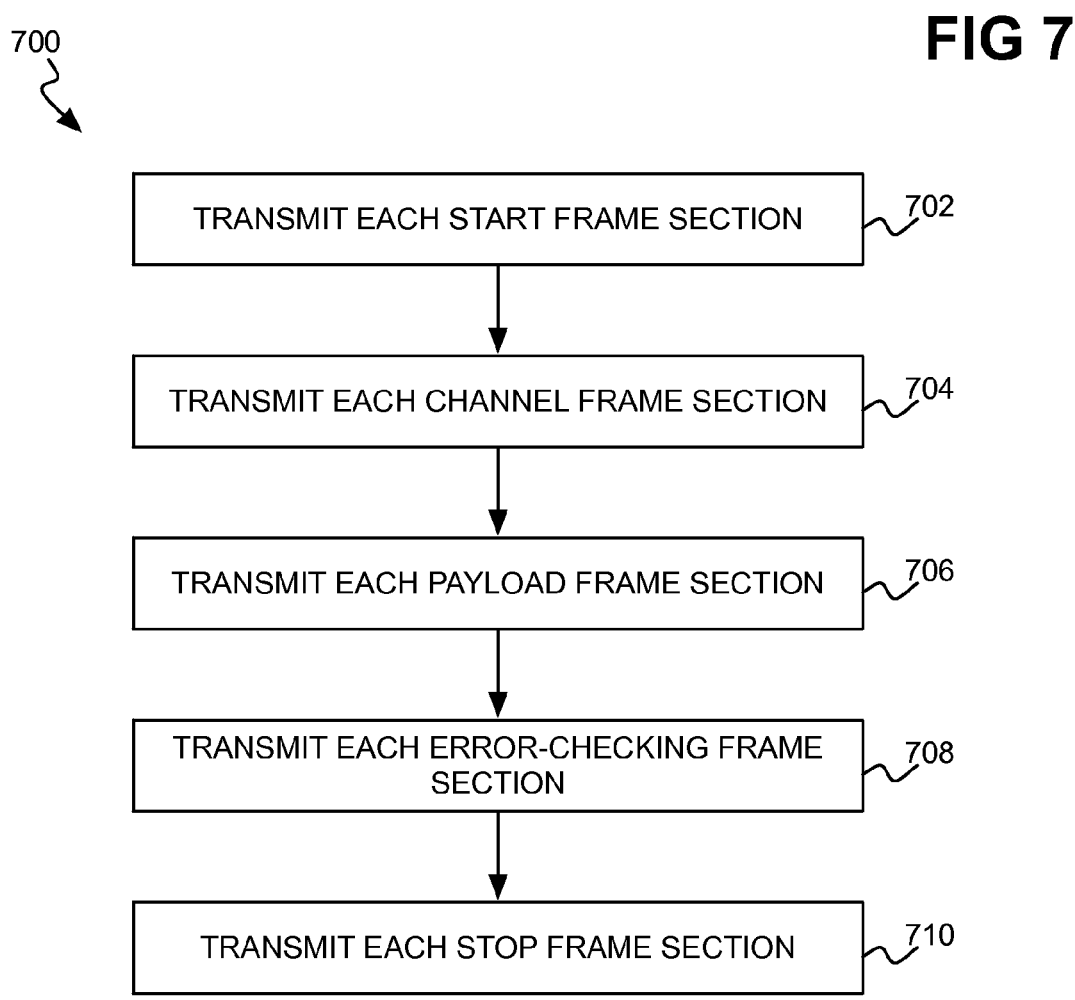
FIG. 7 is a flowchart of an example method to transmit a data frame including multiple frame sections via brightness modulation.

FIG. 7 shows an example method 700 for transmitting the data frame 600 by modulating the brightness of each optical element 108 using the method 300 to send the bit of each data frame section of the data frame 600. The method 700 can be performed by the device 102. More generally, the method 700 can be performed by a device, such as a computing device, executing computer-executable code stored on a non-transitory computer-readable medium.

The method 700 transmits each start frame section 602 (702) by performing the method 300, for instance. The method 700 then transmits each channel frame section 604 (704) by performing the method 300, as well as each payload frame section 606 (706) in a similar manner. Each error-checking frame section 608 is then transmitted (708) by performing the method 300, for instance, followed by each stop frame section 610 (710). It is noted that when there are multiple optical elements 508, the method 700 is performed in parallel for each optical element 508, where the corresponding data frames of the optical elements 508 are temporarily aligned.

Figure 8:
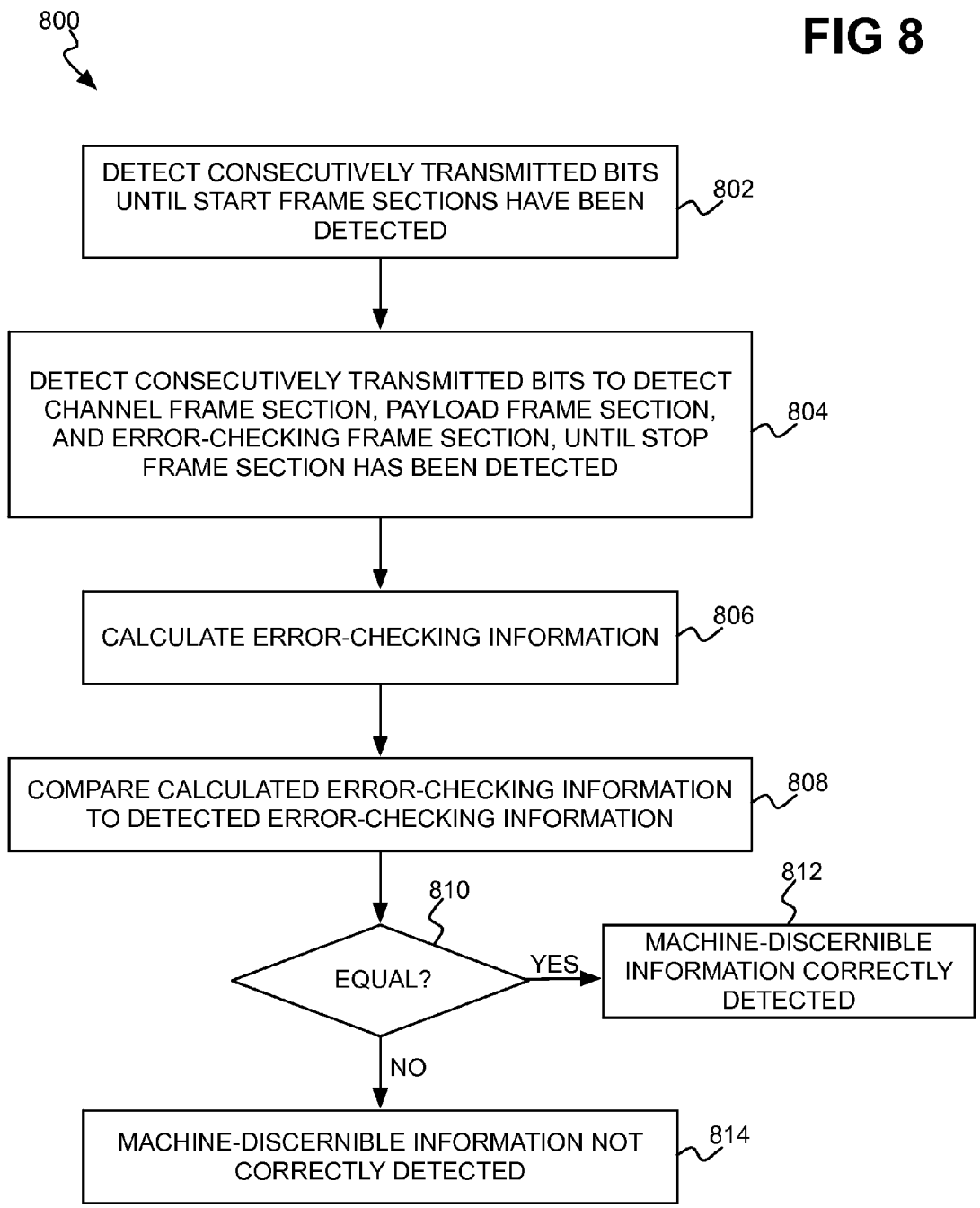
FIG. 8 is a flowchart of an example method to receive via optical detection a data frame including multiple frame sections that have been transmitted via brightness modulation.

FIG. 8 shows an example method 800 for receiving a data frame 600. The method 800 is performed by a device including the optical detector 104. More generally, like the method 700, the method 800 can be performed by a device, such as a computing device, executing computer-executable code stored on a non-transitory computer-readable medium.

For the first data frame 600 that is to be detected, the optical detector 104 detects consecutively transmitted bits, using the method 400, which is considered a bit-detection process, until the start frame sections 602 have been detected (802). That is, the optical detector 104 may begin detecting the brightness modulation of the optical element 108 while the element 108 is in the middle of transmitting a given data frame. The optical detector 104 thus continues to detect consecutive bits until a bit signature or sequence corresponding to the start frame sections 602 has been detected (i.e., a pre-specified sequence of start bits), at which time the detector 104 knows that it is at the start of a new data frame 600. For subsequent data frames, by comparison, the optical detector 104 detects a new data frame as beginning when a current data frame has ended.

It is noted that there is potential for the pre-specified sequence of start bits of the start frame sections 602 to be included in the machine-discernible information of the payload frame sections 606. In this instance, part of the data of the payload frame sections 606 will erroneously be detected as the start frame sections 602 beginning a new data frame. However, the error-checking information of such an erroneously detected frame will ultimately indicate that that machine-discernible information has not been correctly detected, and this problem will correct itself generally when the next, actual data frame is transmitted and optically detected.

Once the start frame sections have been, the optical detector 104 detects consecutively transmitted bits to detect the channel frame sections 604 (if present), the payload frame sections 606 including the machine-discernible information, and the error-checking frame sections 608 including error-checking information, until the stop frame sections 610 have been detected (804). Each bit of each frame section is detected using the bit-detection process of the method 400. The sizes of the channel frame section 604, the payload frame section 606, and the error-checking frame section 608 may each be static or dynamic (i.e., variable) in size. In the latter instance in particular, the end of the data frame 600 cannot be ascertained with certainty until a pre-specified sequence or signature of stop bits corresponding to the stop frame sections 610 has been detected.

The error-checking information of the error-checking frame section 604 detected in part 804 is detected error-checking information. The device including the optical detector 104 also calculates error-checking information from at least the machine-discernible information of the payload frame sections (606), and potentially from the bits of the channel information of the channel frame sections 604 as well. This error-checking information is calculated error-checking information. As noted above, the error-checking information may be in the form of a checksum.

The machine-discernible information has been correctly detected by the optical detector 104 just if the calculated error-checking information is equal to the detected error-checking information. Thus, if they are equal to one another (810), then the method 800 concludes that the machine-discernible information has been correctly detected (812). As part of part 812, the device including the optical detector 104 may perform an action in relation to the machine-discernible information. For example, the information may be decoded and displayed to a user on the device. The information is still considered machine-discernible in this instance, because as transmitted by the modulating circuit 106 modulating the optical element 108, the information is not human-discernible. The information is human-discernible just after it has been received and decoded by the device including the detector 104.

If the detected error-checking information is unequal to the calculated error-checking information, then the method 800 concludes that the machine-discernible information has not been correctly detected (814). In this case, because there is generally no feedback loop back to the device 102 including the modulating circuit 106, the device including the optical detector 104 may therefore have to wait until this portion of the machine-discernible information is transmitted again. The method 800 may thus proceed back to part 802 to detect the next data frame. It is noted that the method 800, as well as the bit-detection process of the method 400, are performed in parallel by the device including the optical detector 104 for each optical element 508, where there are multiple such optical elements 508. That is, the bits being transmitted by multiple such optical element 508 in a given frame section of a given frame are detected in parallel with one another.

In the implementations that have been described thus far, the transmission of data via brightness modulation of the optical element 108 is achieved in a self-clocking manner. This means that the modulating circuit 106 and the optical detector 104 do not have to be synchronized to a common clock, and the circuit 106 does not otherwise have to transmit clock information to the optical detector 104. Rather, the bit-transmission processes of the method 300, per the timing diagrams of FIGS. 2A and 2B, provide for bit detection by the optical detector 104 via detection of a falling edge signaling the start of a new frame section, and detection of the logic value of the bit of the frame section in pre-agreed upon time after the start of the section.

Figure 9:
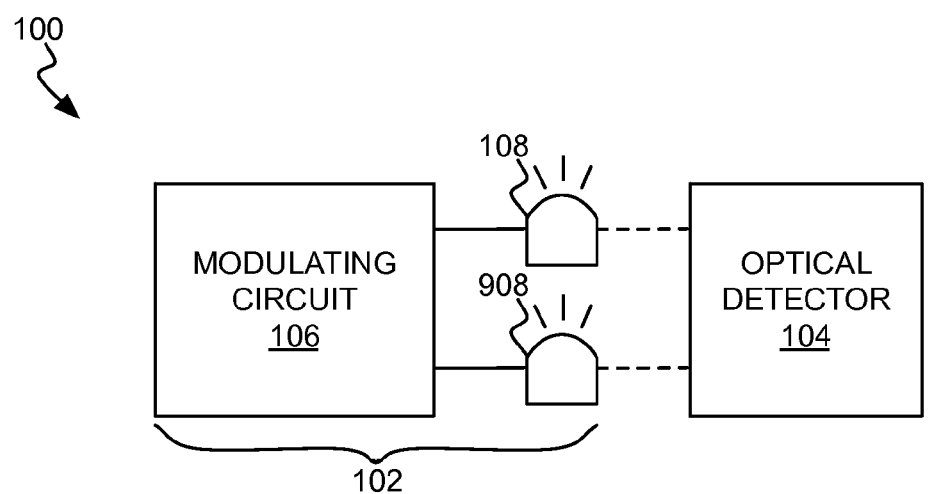
FIG. 9 is a diagram of an example system including a timing optical element to convey clock information to an optical detector.

By comparison, FIG. 9 shows the example system 100 in which there is a timing optical element 908, in addition to the device 102 including the modulating circuit 106 and the optical element 108, and the optical detector 104. In this implementation, the modulating circuit 106 modulates a brightness of the timing optical element 908 to convey clock information to the detector 104. For example, the brightness of the timing optical element 908 may be modulated between high and low values in accordance with a square wave. The optical detector 104 may then use the detected brightness of the optical element 108 at the time of each falling and/or rising edge of the brightness of the timing optical element 908 as corresponding to another bit of data being transmitted by the device 102.

This implementation provides for a simpler bit-detection process than that of the method 400 that has been described. Rather than detecting a falling edge of the brightness of the optical element 108, waiting until the detection point 216, and then redetecting the brightness of the element 108 to determine the current bit being transmitted, the detector 104 uses the falling and/or rising edge of the brightness of the timing optical element 908 as a trigger to detect and correlate the brightness of the element 108 to a logic value. However, the implementation of FIG. 9 does require a timing optical element 908 to convey such clock information, which the self-clocking implementations that have been described avoid. The implementation of FIG. 9 can additionally be employment with multiple optical elements 508 per FIG. 5.

The techniques disclosed herein generally leverage optical elements that convey human-discernible information to also provide machine-discernible information in a manner that can be undetectable by human observers. It is further noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A device comprising:
    an optical element to convey human-discernible information to a user; and
    a modulating circuit to modulate a brightness of the optical element to convey machine-discernible information to an optical detector in addition to the human-discernible information,
    wherein when the modulating circuit is modulating the brightness of the optical element, an operating brightness of the optical element is increased to maintain an average brightness of the optical element equal to the operating brightness of the optical element when the modulating circuit is not modulating the brightness of the optical element.

2. The device of claim 1, wherein the modulating circuit modulates the brightness of the optical element at a speed greater than a flickering threshold at which the user observes flickering of the optical element caused by modulation.

3. The device of claim 1, wherein the modulating circuit is to modulate the brightness to convey a bit of data within a frame section beginning at a falling edge of a preceding frame section corresponding to the brightness of the optical element decreasing to a low level, by:
    at a first predetermined point within the frame section, if the bit of data is logic one, increasing the brightness to a high level, corresponding to a rising edge;
    at a second predetermined point within the frame section later than the first predetermined point, if the bit of data is logic zero, increasing the brightness to the high level, corresponding to the rising edge; and
    at an end of the frame section, decreasing the brightness to the low level, corresponding to a falling edge of the frame section.

4. The device of claim 3, wherein the bit of data of the frame section is detectable between the first predetermined point and the second predetermined point within the frame section,
    wherein the bit of data of the frame section is not accurately detectable before the first predetermined point and after the second predetermined point.

5. The device of claim 3, wherein the modulating circuit is to modulate the brightness of the optical element to convey the machine-discernible information to the optical detector in a self-clocking manner so that the modulating circuit does not have to convey clock information to the optical detector and so that the modulating circuit and the optical detector do not have been synchronized to a common clock.

6. The device of claim 1, wherein the modulating circuit is to modulate the brightness to serially convey a plurality of bits of data within a plurality of frame sections of a data frame, the frame sections of the data frame comprising:
    a plurality of start frame sections including the bits of the data that are pre-specified to signify a beginning of the data frame;
    a plurality of payload frame sections including the bits of the data that correspond to the machine-discernible information conveyed to the optical detector;
    a plurality of error-checking frame sections including the bits of the data that are calculated from the bits of the data of the payload frame sections for the optical detector to use to determine whether the machine-discernible information has been successfully detected; and
    a plurality of stop frame sections including the bits of the data that are pre-specified to signify an ending of the data frame.

7. The device of claim 6, wherein the frame sections of the data frame further comprise:
    one or more channel frame sections including the bits of the data that signify a data channel of a plurality of data channels, the optical element corresponding to the data channel.

8. The device of claim 7, wherein the optical element is one of a plurality of optical elements to convey the human-discernible information to the user, and the modulating circuit is to modulate brightnesses thereof to convey the machine-discernible information to the optical detector,
    wherein each optical element corresponds to a different data channel of the machine-discernible information,
    wherein data of each data channel is serially transmitted by the modulating circuit modulating the brightness of the corresponding optical element,
    wherein the data of each data channel is transmitted in parallel in relation to the data of other of the data channels by the modulating circuit modifying the brightnesses of the optical elements in a synchronized manner.

9. The device of claim 1, further comprising:
    a timing optical element having a brightness that the modulating circuit modulates to convey clock information to the optical detector, the clock information providing a clock speed at which the modulating circuit modulates the brightness of the optical element to convey the machine-discernible information.

10. The device of claim 1, wherein the optical element comprises one of:
    a discrete light-emitting diode (LED);
    a display element of a plurality of display elements that display an image to the user.

11. A non-transitory computer-readable medium storing computer executable code that when executed by a computing device causes the computing device to perform a method comprising:
    detecting, by an optical detector of the computing device, a brightness of an optical element decreasing from a high level to a low level;
    waiting a predetermined length of time after detecting the brightness decreasing to the low level;
    after the predetermined length of time has elapsed, redetecting the brightness of the optical element, as a data-conveying brightness of the optical element;
    if the data-conveying brightness corresponds to the low level, determining that the optical element has transmitted a bit corresponding to logic zero; and
    if the data-conveying brightness corresponds to the high level, determining that the optical element has transmitted a bit corresponding to logic one, wherein the predetermined length of time is pre-specified, such that the computing device does not detect clock information from a circuit controlling the optical element, and such that the computing device and the circuit are not synchronized to a common clock.

12. The non-transitory computer-readable medium of claim 11, wherein detecting the brightness of the optical element through determining that the optical element has transmitted each bit corresponding to logic zero or logic one is a bit-detection process, and the method further comprises:
repeating the bit-detection process to detect a first plurality of consecutively transmitted bits until a pre-specified sequence of start bits has been detected; and
immediately after detecting the pre-specified sequence of start bits, repeating the bit-detection process to detect a second plurality of consecutively transmitted bits, as machine-discernible information and detected error-checking information, until a pre-specified sequence of stop bits has been detected.

13. The non-transitory computer-readable medium of claim 12, wherein the second plurality of consecutively transmitted bits includes channel information as well as the machine-discernible information and the detected error-checking information.

14. The non-transitory computer-readable medium of claim 12, wherein the method further comprises:
calculating calculated error-checking information from the machine-discernible information;
comparing the calculated error-checking information to the detected error-checking information;
in response to determining that the calculated error-checking information is equal to the detected error-checking information, concluding that the machine-discernible information has been correctly detected and performing an action in relation to the machine-discernible information; and
in response to the determining that the calculated error-checking information is unequal to the detected error-checking information, concluding that the machine-discernible information has not been correctly detected and proceeding back to repeating the bit-detection process to detect the first plurality of consecutively transmitted bits.

15. The non-transitory computer-readable medium of claim 11, wherein detecting the brightness of the optical element comprises detecting brightnesses of a plurality of optical elements including the optical element, in parallel,
wherein detecting the data-conveying brightness of the optical element comprises detecting data-conveying brightnesses of the optical elements, in parallel,
wherein bits transmitted by the optical elements are determined as corresponding to logic zero or logic one, in parallel.

16. A method comprising:
modulating, by a modulating circuit of a device, a brightness of an optical element of the device to serially convey a plurality of bits of data of machine-discernible information to an optical detector within a plurality of frame sections of a data frame,
wherein the frame sections of the data frame comprise:
a plurality of start frame sections including the bits of the data that are pre-specified to signify a beginning of the data frame;
a plurality of payload frame sections including the bits of the data that correspond to the machine-discernible information conveyed to the optical detector;
a plurality of error-checking frame sections including the bits of the data that are calculated from the bits of the data of the payload frame sections for the optical detector to use to determine whether the machine-discernible information has been successfully detected; and
a plurality of stop frame sections including the bits of the data that are pre-specified to signify an ending of the data frame,
and wherein the optical element is to convey human-discernible information to a user, the modulating circuit modulating the brightness of the optical element to convey the machine-discernible information to the optical detector in addition to the human-discernible information.

17. The method of claim 16, wherein the frame sections of the data frame further comprise:
one or more channel frame sections including the bits of the data that signify a data channel of a plurality of data channels, the optical element corresponding to the data channel.

18. The method of claim 17, wherein the optical element is one of a plurality of optical elements to convey the human-discernible information to the user, and the modulating circuit is to modulate brightnesses thereof to convey the machine-discernible information to the optical detector,
wherein each optical element corresponds to a different data channel of the machine-discernible information,
wherein data of each data channel is serially transmitted by the modulating circuit modulating the brightness of the corresponding optical element,
wherein the data of each data channel is transmitted in parallel in relation to the data of other of the data channels by the modulating circuit modifying the brightnesses of the optical elements in a synchronized manner.

19. The method of claim 16, wherein modulating the brightness to serially convey the bits of data within the frame sections of the data frame comprises modulating the brightness to convey a given bit of data within a given frame section of the frame sections beginning at a falling edge of a preceding frame section of the frame sections corresponding to the brightness of the optical element decreasing to a low level, by:
at a first predetermined point within the given frame section, if the given bit of data is logic one, increasing the brightness to a high level, corresponding to a rising edge;
at a second predetermined point within the given frame section later than the first predetermined point, if the given bit of data is logic zero, increasing the brightness to the high level, corresponding to the rising edge; and
at an end of the given frame section, decreasing the brightness to the low level, corresponding to a falling edge of the given frame section.

* * * * *